Sept. 19, 1967  C. J. LUTGEN  3,342,523
SECTIONAL COVER APPARATUS FOR VEHICLES
Filed Oct. 24, 1965  2 Sheets-Sheet 1

INVENTOR.
CHARLES J. LUTGEN
BY
Williamson & Palmatier
ATTORNEYS

Sept. 19, 1967        C. J. LUTGEN        3,342,523
SECTIONAL COVER APPARATUS FOR VEHICLES
Filed Oct. 24, 1965        2 Sheets-Sheet 2
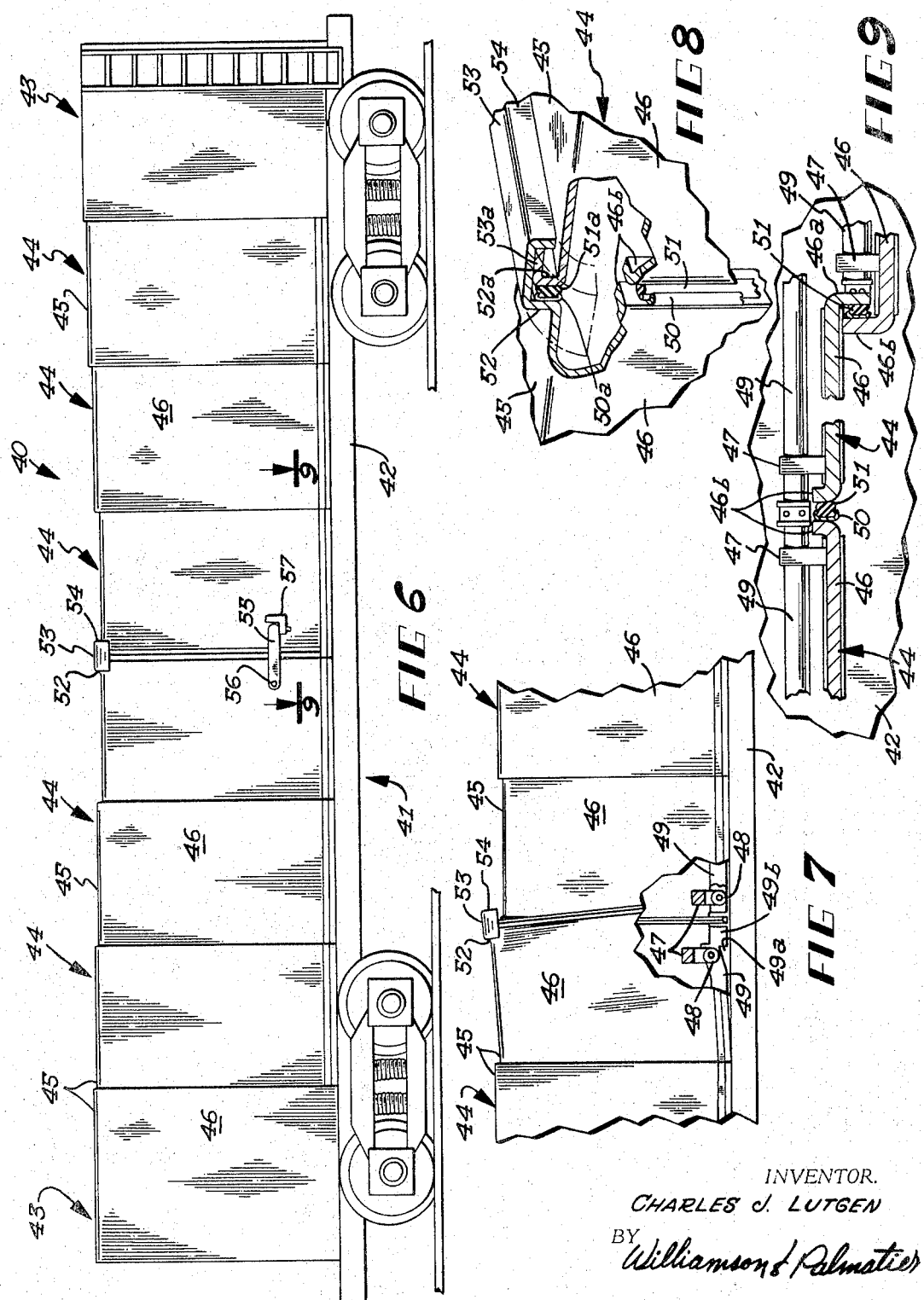
INVENTOR.
CHARLES J. LUTGEN
BY
Williamson & Palmatier
ATTORNEYS United States Patent Office 3,342,523
Patented Sept. 19, 1967

3,342,523
SECTIONAL COVER APPARATUS FOR VEHICLES
Charles J. Lutgen, 632 Central Ave. N.,
Osseo, Minn. 55369
Filed Oct. 24, 1965, Ser. No. 504,751
3 Claims. (Cl. 296—100)

ABSTRACT OF THE DISCLOSURE

An extensible and retractable sectional cover apparatus including a plurality of cover sections each comprised of a rigid top wall and depending side walls. Rollers on the side walls engaging channel-shaped tracks on the vehicle floor to permit extension and retraction of the sections with respect to each other. One of the sections being fixedly mounted on the vehicle floor and the other of said sections being telescopically movable into the fixed sections.

This invention relates to an extensible and retractable sectional cover apparatus for vehicles such as trucks, trailers, railway cars and the like.

An object of this invention is the provision of a novel improved extensible and retractable sectional cover apparatus which may be mounted upon the floor or walls of a vehicle such as a truck, a trailer or railway car so that a closed vehicle body is defined, and which may be readily opened by retracting the apparatus sections into telescoping relation with respect to each other, to thereby facilitate loading and unloading of the vehicle.

These and other objects and advantages of the invention will more fully appear from the following description made in connection with the accompanying drawings, wherein like character references refer to the same or similar parts throughout the several views, and in which:

FIG. 6 is a side elevational view of a further embodiment of the sectional cover apparatus mounted on a railway flat car.

FIG. 7 is a fragmentary side elevational view with parts thereof broken away illustrating the manner in which a pair of sections are moved into sealing relation.

FIG. 8 is a fragmentary perspective view with parts thereof broken away illustrating the seal means between adjacent sections and FIG. 9 is a fragmentary plan view partly in section and partly in elevation illustrating the interlocking seal connection between adjacent sections.

Figure 1:
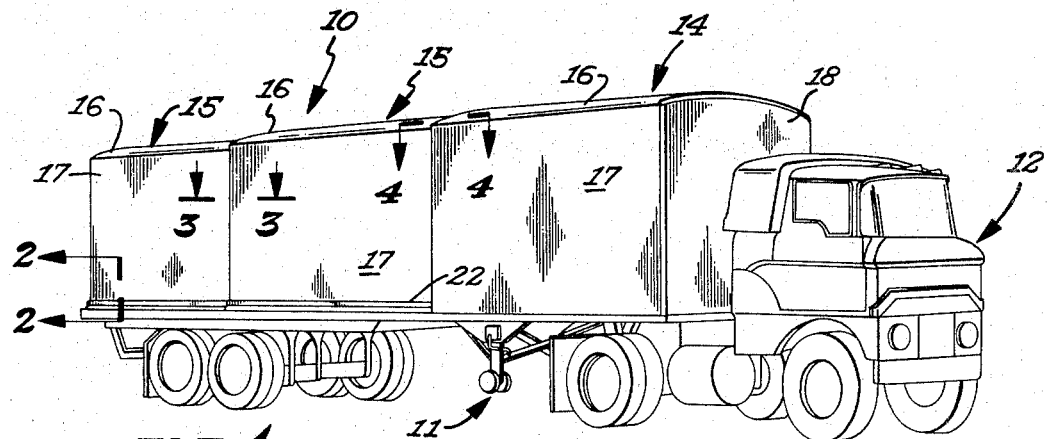
FIG. 1 is a front perspective view of a towed type truck trailer incorporating my novel invention.

Referring now to FIGS. 1-4 it will be seen that on embodiment of the sectional cover apparatus designated generally by the reference numeral 10 is shown mounted in cooperating relation on a towed type trailer designated generally by the reference numeral 11. The trailer 11 is of the multi-dual wheel type and is connected to the truck 12 by conventional fifth wheel device. The trailer 11 has no side walls and is the flat bed type and includes only a floor or bottom wall 13. The sectional cover apparatus 10 is therefore mounted on the bottom wall 13.

It will be seen that the sectional cover apparatus 10 includes a fixed section 14 and a plurality of movable sections 15. Each of the sections is of similar configuration and construction and each is comprised of a top wall 16 which, as shown, is of generally arcuate construction in a transverse direction and each section also is provided with a pair of opposed side walls 17 rigidly formed with the top wall and depending therefrom. These sections may be formed of any suitable rigid material such as metal or the like and in some instances the sections will be of double panel construction with suitable insulating material therebetween. It will be noted that the fixed section 14 is located at the forward portion of the bottom wall 13 of the trailer 11 and this fixed section may be secured to the bottom wall by any suitable securing means such as bolts or the like. The fixed section 14 also includes a front wall 18 while the rearmost movable section 15 may be provided with a movable closure member which may be swung or otherwise moved to an open condition or may be removed therefrom.

The movable sections are shiftable from the extended position illustrated in FIG. 1 to a retracted position wherein the sections are telescoped within the fixed section 14 which permits ready access to the uncovered portion of the bottom wall. This type of arrangement facilitates both loading and unloading of the trailer. Although only one is shown each side wall 17 of each movable section is provided with a plurality of inwardly projecting L-shaped brackets 19 and each bracket has a roller 20 revolvably mounted thereon.

The bottom wall 13 has a plurality of pair of generally channel shaped tracks 21 mounted thereon each track accommodating those rollers associated with one of the side walls 17 of one of the movable sections 15. Thus a pair of tracks will be provided for each movable section 15, each track of each pair being located adjacent one of the longitudinal edges of the bottom wall 13. It is pointed out that since the rearmost movable section telescopes within the next adjacent movable section, the tracks 21 associated with the rearmost movable section will be positioned slightly inwardly of the next adjacent forwardly located pair of tracks. Therefore, if more than two movable sections are provided, the tracks will be arranged in this particular manner whereby the next adjacent rearwardly located set of tracks is positioned slightly inwardly of the adjacent forwardly set of tracks. Thus it will be seen that each movable section is supported for rolling movement into and out of telescoping relation with respect to the fixed section 14.

In order to provide the vehicle body which is substantially sealed from the exterior it will be seen that the rear peripheral portion of each top wall has a downturned flange 16a and that the forward portion of each section has an upturned flange 16b. It is clearly evident that the front portion of the fixed section 14 will not have an upturned flange since the fixed section is provided with a front wall 18 at its forward end. The rear portion of each of the side walls 17 of each section is also turned inwardly to define a flange 17a which is continuous with the flange 16a of the associated top wall. However, it is pointed out that the rearmost movable section does not suit an inturned flange at its rear end since this end is provided with a suitable closure member of conventional construction.

It will also be seen that the side walls 17 of each of the movable sections is provided with an outturned flange 17b at its forward most end which is continuous with the flange 16b. It will further be seen that each downturned flange 16a is disposed in obstructing relation with respect to an upturned flange 16b of the adjacent movable section 15b. Similarly, each inturned flange 17a at the rear portion of one section is disposed in obstructing relation with respect to the outturned flange 17b of the next adjacent section so that the sections are interlocked against extensible movement beyond a predetermined position.

Figures 2, 3, 4:
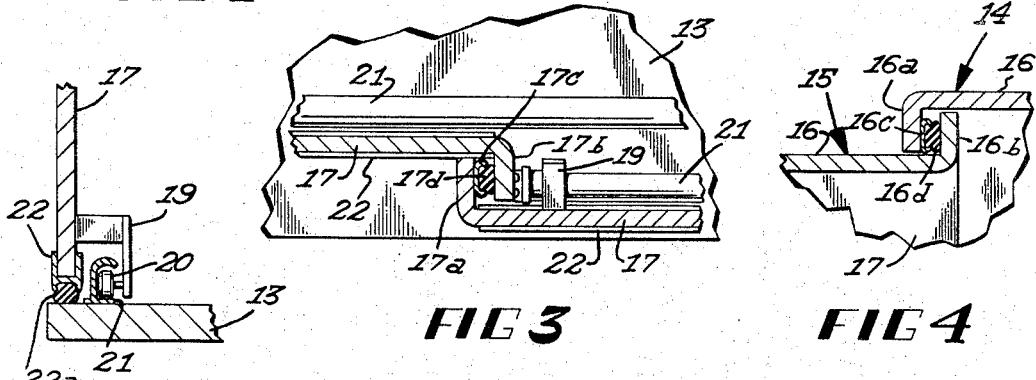
FIG. 2 is a cross-sectional view on an enlarged scale taken approximately along line 2—2 of FIG. 1 and looking in the direction of the arrows.
FIG. 3 is a cross-sectional view taken approximately along line 3—3 of FIG. 1 and looking in the direction of the arrows.
FIG. 4 is a cross-sectional view taken approximately along line 4—4 of FIG. 1 and looking in the direction of the arrows.

Each of the outturned flanges 16a located at the rear marginal portions of the top wall of each section has a channel shaped molding 16c secured to the inner surface thereof and substantially throughout the width thereof, this molding being preferably formed of a suitable metallic or plastic material as best seen in FIG. 4. Each molding 16c carries an elongate sealing element 16d therein which projects outwardly therefrom. Each sealing element is formed of a yieldable somewhat compressable material such as plastic, rubber or the like and engages the associated upturned flange 16b of the adjacent section when the sectional cover apparatus is in the extended position. With this arrangement, a very effective seal is formed thereat. Similarly, each inturned flange 17a located at the rear marginal portion of each side walls 17 has a channel shaped molding 17c which is a continuation of the molding 16c. The molding 17c carries a yieldable sealing element 17b therein which constitutes the terminal portions of the sealing element 16d. The sealing element 17d engages an outturned flange 17b of the adjacent section when the cover apparatus is in the extended position. Thus it will be seen that a highly effective seal is provided throughout the interrelated, interlocked peripheral portions of adjacent sections of the cover apparatus.

Referring now to FIG. 2, it will be seen that each of the side walls 17 of the movable sections 15 are spaced slightly above the upper surface of the floor or bottom wall 13. An elongate channel shaped molding 22 preferably constructed of an extruded metal or plastic material is secured to the lower edge portion of each side wall and each of these moldings carries an elongate sealing element 22a therein which projects downwardly therefrom and which is formed of a yieldable compressible material in the manner of the sealing elements 16d, 17d. It will be noted that the sealing elements 22 engage the upper surface of the bottom wall 13 to form a seal thereat so that the interior of the trailer body defined by the sectional cover apparatus 10 and the bottom wall 13 is completely sealed from the exterior. Although not shown in the drawing, a suitable lock releasable lock means may be provided for retaining the sections in an extended relation.

Figure 5:
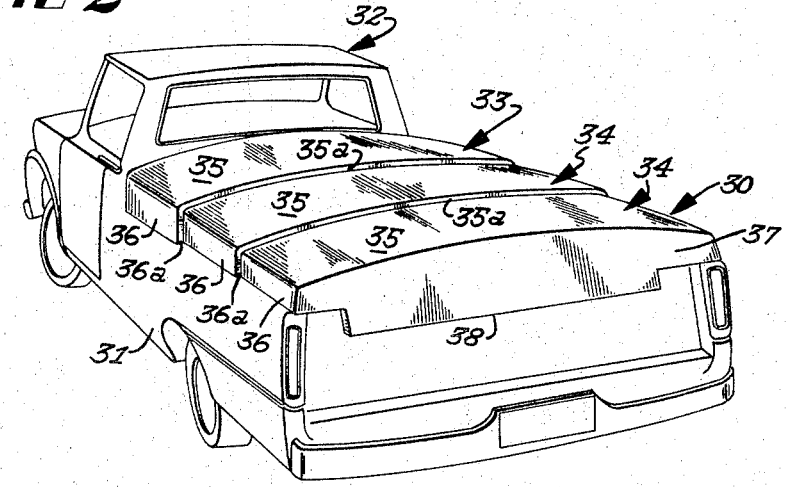
FIG. 5 is a rear perspective view of a different embodiment of the sectional cover apparatus mounted on a pick-up type truck.

Referring now to FIG. 5 it will be seen that a different embodiment of the sectional cover apparatus designated generally by the reference numeral 30 is shown in cooperating relation with the body 31 of a conventional pickup truck 32. The sectional apparatus includes a fixed section 33 and a pair of movable sections 34. It will be noted that each of the sections is comprised of a top wall 35 which is slightly arcuate in a transverse direction having relatively shallow or short side walls 36 integrally formed therewith and depending therefrom. The side walls project downwardly beyond the sides of the body 31 and each is provided with L-shaped brackets having rollers thereon that engage tracks located on the upper surfaces of the side walls of the truck body so that the movable sections may telescope into retracted relation in the manner of the embodiment of FIGS. 1–4. It is also pointed out that the rear peripheral portion of the top wall of each section is provided with a downwardly extending flange 35a and that the rear portion of the side walls of each section is also provided with an inturned flange 36a.

The rear movable section however is provided with a rear wall 38 and of course does not have inturned flanges. Although not shown in the drawings, the front marginal portions of the top walls as well as the side wall have outturned flanges which engage sealing elements that are carried by the downwardly and interprojecting flanges on the rear portions of the adjacent section. Thus a highly effective seal is provided at the interlocked ends of each section, in the manner of the embodiment of FIGS. 1–4, when the sectional cover apparatus is in the extended position.

Although not shown in FIG. 5, the upper edge surface of the side walls of the truck body 31 is provided with two pairs of tracks for the movable sections 34, the latter being provided with rollers carried by the lower marginal portions of the side walls 36 and positioned within the tracks. Thus the embodiment of FIG. 5 is similar in construction and operation to the embodiment of FIGS. 1–4.

In operation the sectional cover apparatus will be disposed in covering relation with respect to the track body 31. To retract the apparatus it is merely necessary to lift the rear 38 slightly to clear the tailgate of the truck body and the movable sections may then be rolled into telescoping relation with the fixed section 33 to facilitate loading and unloading of the truck body.

Referring now to FIGS. 6–9 it will be seen that a still further embodiment of the sectional cover apparatus designated generally by the reference numeral 40 is shown in cooperating relation with a railway flat car 41. The sectional cover apparatus 40 cooperates with the bottom wall or floor member 42 to define a sealed compartment which corresponds in volumetric space to the conventional box car but which may be readily retracted to an open condition to facilitate loading and unloading of the railway car. The sectional cover apparatus 40 includes a pair of fixed sections 43 each fixedly mounted adjacent opposite ends of the floor member 42 of the railway car 41. A plurality of movable sections 44 are associated with each fixed section and are extensible and retractable relative thereto. In the embodiment shown, each fixed section 43 has three movable sections associated therewith. Each of the sections includes a top wall 45 and depending side walls 46. The two fixed sections 43 are also provided with end wall which close the ends of the compartment defined by the railway flat car and the sectional cover apparatus 40.

Each section of the sectional cover apparatus has an inturned continuous U-shaped flange formed at that end thereof which is located towards the center of the flat car when the sectional cover apparatus is in the extended position. Similar, each section is also provided with an outturned flange integrally formed with the top sides thereof at that end which is located distally of the center of the flat car when the cover apparatus is in the extended position. The flanges are arranged in obstructing relation in the manner of the embodiments of FIGS. 1 and 2 and the inwardly projecting flange of each section is provided with a molding and seal element to engage the obstructing flange on the adjacent section in the manner of the embodiment of FIGS. 1–4 to form a seal between the adjacent sections. Similarly, each section has a molding and sealing element carried thereby which is affixed to the lower edge portion of each side wall so that a seal is formed at the lower surfaces of each section. Therefore when the section is in the extended position as illustrated in FIG. 6, the interior of the compartment thus defined is substantially sealed from the exterior. It is pointed out that the sealing element and molding are of the type illustrated in the previously discussed embodiments.

Each of the movable sections 44 is provided with a plurality of inwardly projecting L-shaped brackets 47 secured to the side walls 46 thereof, each bracket having a roller 48 carried thereby which engages one of a pair of inwardly facing channel shaped tracks 49 mounted on the floor member 42 of the flat car 41. The tracks 49 extend from within one of the fixed sections 43 towards the center of the flat car and are located along opposite longitudinal edges thereof. The pair of tracks that are associated with the movable section located most distally from the associated fixed section when the apparatus is in the extended position is positioned interiorally and substantially parallel to the tracks of the next adjacent movable section. Thus the two movable sections which actually define the center portion of the sectional cover apparatus have the longest set of track. It is pointed out that the three movable sections 44 associated with each fixed section are moved away from the center towards the associated fixed section and are telescoped therein when the sectional cover apparatus is in the retracted position. It will also be seen from FIG. 6 that when the sectional cover apparatus is in the extended position, two of the movable sections which define the center of the cover apparatus are disposed in abutting relation when the sectional cover apparatus is in the extended position. Thus it will be noted that the respective abutting ends of the two centrally located movable sections are provided with inturned flanges 46b one of which has a vertically extending channel shaped molding 50 secured thereto and which carries an elongate sealing element 51 formed of a compressible yieldable material. It will also be noted from FIG. 8 that the top wall 45 of one of the centrally located movable sections 44 is provided with an upturned flange 52 and the other movable section has an upturned flange 52a integrally formed with the top wall 45 thereof. It will be noted that the flange 52a is substantially shorter than the flange 52, the latter having a horizontal flange element 53 formed therewith. Similarly, the upturned flange 52a has a horizontal member 53a integrally formed therewith. The horizontal flange element 53 terminates in a downwardly extending flange element 54 as best seen in FIG. 8. A molding 50a of channel shaped configuration and being continuous with the molding 50 is secured to the flange 52 and a yieldable somewhat compressible seal element 51a which is continuous with the seal 51 is carried by the molding 50a. It will be seen that each of the tracks 49, that are associated with the movable section having the upturned flange 52 are provided with an inclined ramp portion 49a which is relieved at 49b to permit the movable section 44a associated therewith to be elevated when this section is extended. When this occurs, the flange elements 53 and 54 can ride above the flange element 53a into interlocking relation therewith as best seen in FIG. 8.

Each side wall 46 of one of these centrally located movable sections 44 is provided with a pivotal latch bar 55 pivoted about a pivot 56 and which engages a latch bar retaining element 57 carried by the other of these centrally located movable sections. Thus a positive but releasable locking means is provided for retaining the movable sections in an extended position.

It will therefore be seen that the sectional cover apparatus 40 may be readily moved between a retracted position to an extensible position to facilitate loading and unloading of the railway car.

The advantages of this particular system are quite evident since the major portion of the railway car is made readily accessible when the sectional cover apparatus is moved to the retracted position. This is a distinct advantage over the conventional box cars wherein only limited access is provided by the doors thereon. The highly effective sealing means provides a seal at those interlocking areas of each section as well as in the lower marginal edge portions of the sectional cover apparatus.

It will therefore be seen that I have provided a novel sectional cover apparatus which is not only of simple and inexpensive construction but one which functions in a more efficient manner than any heretofore known comparable device.

It will, of course, be understood that various changes may be made in the form, details, arrangement and proportions of the various parts without departing from the scope of my invention.

What is claimed is:

1. An extensible and retractable sectional cover apparatus for vehicles having an upwardly exposed floor, said apparatus comprising a plurality of cover sections including a fixed section fixedly mounted on said vehicle, a plurality of movable sections including an intermediate movable section and an end movable section, each of said sections being comprised of a rigid top wall having side walls integrally formed therewith and depending therefrom,
    a plurality of rollers affixed to the lower edge portions of the side walls of each movable section,
    a plurality of pairs of elongate longitudinally extending channel-shaped tracks affixed to the vehicle adjacent opposite sides thereof, one of said pairs of tracks receiving the rollers of the intermediate movable section therein, and another pair of said tracks receiving the rollers of said movable end section therein, the tracks for said intermediate movable section being laterally offset with respect to the tracks of said movable end section, said movable sections being shiftable relative to said fixed section longitudinally of the vehicle between an extended position and retracted position,
    said sections being disposed in telescoping relation when in said retracted position, said fixed section and said movable end section each having a continuous transversely extending flange at one end thereof and said intermediate movable section having flanges at opposite ends thereof, the flanges on one of said sections being disposed in obstructing interlocking relation with the flanges on the next adjacent section when said sections are in the extended position,
    yieldable compressible seal means on the flange of one of said sections engaging the flanges of the other sections when these sections are in extended position to form a seal between adjacent of said sections.

2. The sectional cover apparatus as defined in claim 1 wherein each of said movable sections is provided with a yieldable compressible sealing element affixed to the lower marginal edge portion of the depending walls throughout the length thereof and engaging the upper surface of the vehicle forward upon the seal therein.

3. An extensible and retractable sectional cover apparatus for vehicles having an upwardly exposed floor, said apparatus comprising
    a plurality of cover sections each including a pair of spaced apart fixed sections mounted at adjacent opposite ends if the vehicle and each including a rigid top wall having side walls integrally formed therewith and depending therefrom, a plurality of movable sections connected with each of said fixed sections and being extensible and retractable relative thereto, said movable sections for each fixed section including an intermediate movable section and an end movable section,
    a plurality of rollers affixed to the lower edge portion of the side walls of each movable section,
    a plurality of pairs of elongate longitudinally extending channel-shaped tracks affixed to the vehicle adjacent opposite sides thereof, one pair of said tracks receiving the rollers of each movable section therein, tracks for each intermediate movable section being laterally offset with respect to the tracks for the associated movable end section,
    said sections being disposed in telescoping relation when in said retracted position, each of said sections having continuous transversely extending flanges thereon which are disposed in obstructing interlocking relation with the flanges of the next adjacent section when said sections are in the extended position, said flanges on said movable end sections interlocking with each other when in the extended condition, yieldable compressible seal means on the flanges of one of said sections engaging the flanges of the other section when said sections are in the extended position to form a seal between adjacent of said sections, a pair of tracks associated with one of said end movable sections including a ramp portion to permit said last mentioned movable end section to be elevated when the section is extended and to permit interlocking of the flange thereon with the adjacent flange of the other movable end section, lock means for locking said movable end sections together when in the extended position.

References Cited

UNITED STATES PATENTS

| | | | |
|---|---|---|---|
| 2,074,358 | 3/1937 | Bixel et al. | 296—100 |
| 2,853,340 | 9/1958 | Hershberger | 296—100 X |
| 3,165,352 | 1/1965 | Hallock et al. | 296—100 |

FOREIGN PATENTS

| | | |
|---|---|---|
| 1,219,426 | 5/1960 | France. |

LEO FRIAGLIA, *Primary Examiner.*

BENJAMIN HERSH, *Examiner.*

C. C. PARSONS, *Assistant Examiner.*